United States Patent
Gupta et al.

(10) Patent No.: US 12,212,709 B2
(45) Date of Patent: Jan. 28, 2025

(54) CALL AUTHENTICATION AT THE CALL CENTER USING A MOBILE DEVICE

(71) Applicant: PINDROP SECURITY, INC., Atlanta, GA (US)

(72) Inventors: Payas Gupta, Atlanta, GA (US); Terry Nelms, II, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 17/004,921

(22) Filed: Aug. 27, 2020

(65) Prior Publication Data

US 2020/0396331 A1    Dec. 17, 2020

Related U.S. Application Data

(63) Continuation-in-part of application No. 16/287,879, filed on Feb. 27, 2019, now Pat. No. 11,019,203.

(60) Provisional application No. 62/893,033, filed on Aug. 28, 2019, provisional application No. 62/640,826, filed on Mar. 9, 2018.

(51) Int. Cl.
*H04M 3/42* (2006.01)
*H04W 12/06* (2021.01)

(52) U.S. Cl.
CPC ... *H04M 3/42042* (2013.01); *H04M 3/42059* (2013.01); *H04W 12/068* (2021.01); *H04M 2203/6045* (2013.01)

(58) Field of Classification Search
CPC ........... H04W 12/068; H04M 3/42042; H04M 3/42059; H04M 2203/6045
See application file for complete search history.

(56) References Cited

U.S. PATENT DOCUMENTS

| | | | |
|---|---|---|---|
| 5,949,874 | A | 9/1999 | Mark |
| 6,021,119 | A | 2/2000 | Derks et al. |
| 8,046,230 | B1 | 10/2011 | Mcintosh |
| 8,135,119 | B1 | 3/2012 | Zhao et al. |

(Continued)

FOREIGN PATENT DOCUMENTS

WO    WO-2018/236625 A1    12/2018

OTHER PUBLICATIONS

U.S. Appl. No. 62/928,222, filed Oct. 30, 2019) (Year: 2019).*

(Continued)

*Primary Examiner* — Steven S Kelley
(74) *Attorney, Agent, or Firm* — Foley & Lardner LLP

(57) ABSTRACT

Embodiments described herein provide for automatically authenticating telephone calls to an enterprise call center. The system disclosed herein builds on the trust of a data channel for the telephony channel. Certain types of authentication information can be received through the telephony channel, as well. But the mobile application associated with the call center system may provide additional or alternative forms of data through the data channel. The system may send requests to a mobile application of a device to provide information that can reliably be assumed to be coming from that particular device, such as a state of the device and/or a user's response to push notifications. In some cases, the authentication processes may be based on quantity and quality of matches between certain metadata or attributes expected to be received from a given device as compared to the metadata or attributes received.

18 Claims, 8 Drawing Sheets

(56) References Cited

U.S. PATENT DOCUMENTS

| | | |
|---|---|---|
| 8,254,541 B2 | 8/2012 | Cai |
| 8,660,255 B2 | 2/2014 | Theivendran et al. |
| 8,738,442 B1 | 5/2014 | Liu et al. |
| 8,856,895 B2 | 10/2014 | Perrot |
| 9,001,985 B2 | 4/2015 | Cox et al. |
| 9,060,057 B1 | 6/2015 | Danis |
| 9,094,519 B1* | 7/2015 | Shuman .............. H04L 65/1069 |
| 9,277,049 B1 | 3/2016 | Danis |
| 9,332,119 B1 | 5/2016 | Danis |
| 9,338,619 B2 | 5/2016 | Kang |
| 9,344,892 B1 | 5/2016 | Rodrigues et al. |
| 9,531,695 B2 | 12/2016 | Koppolu et al. |
| 9,544,440 B2 | 1/2017 | Deng et al. |
| 9,549,062 B1 | 1/2017 | Yaung et al. |
| 9,762,728 B1 | 9/2017 | Cox et al. |
| 9,781,255 B1 | 10/2017 | Gailloux et al. |
| 9,800,612 B2 | 10/2017 | Harvey et al. |
| 9,860,367 B1 | 1/2018 | Jiang et al. |
| 9,942,766 B1 | 4/2018 | Bonn et al. |
| 10,044,647 B1* | 8/2018 | Karp ...................... H04L 51/02 |
| 10,142,464 B1 | 11/2018 | Cairns et al. |
| 10,149,156 B1* | 12/2018 | Tiku ...................... H04W 12/66 |
| 10,389,874 B1 | 8/2019 | Farnsworth et al. |
| 11,019,203 B2* | 5/2021 | Gupta ................. H04L 63/0876 |
| 11,258,896 B1* | 2/2022 | Cox ...................... H04L 63/123 |
| 2004/0023644 A1* | 2/2004 | Montemer .......... H04M 3/4878 |
| | | 455/560 |
| 2006/0142012 A1 | 6/2006 | Kirchhoff et al. |
| 2007/0116227 A1 | 5/2007 | Vitenson et al. |
| 2008/0219177 A1 | 9/2008 | Flynn et al. |
| 2008/0253376 A1* | 10/2008 | Charzinski ........... H04L 63/126 |
| | | 370/395.2 |
| 2009/0080624 A1 | 3/2009 | Small et al. |
| 2009/0097630 A1 | 4/2009 | Fotta |
| 2009/0138712 A1 | 5/2009 | Driscoll |
| 2009/0274143 A1 | 11/2009 | Garg et al. |
| 2010/0040216 A1* | 2/2010 | Chida ...................... H04M 1/57 |
| | | 379/142.17 |
| 2011/0183652 A1 | 7/2011 | Eng et al. |
| 2011/0211572 A1 | 9/2011 | Campion et al. |
| 2011/0250874 A1 | 10/2011 | Shah et al. |
| 2012/0166185 A1 | 6/2012 | Zirngibl et al. |
| 2013/0016819 A1 | 1/2013 | Cheethirala |
| 2013/0156170 A1 | 6/2013 | Springer |
| 2014/0241513 A1 | 8/2014 | Springer |
| 2014/0250512 A1 | 9/2014 | Goldstone et al. |
| 2014/0335822 A1 | 11/2014 | Jain |
| 2015/0024712 A1 | 1/2015 | Kang |
| 2015/0036813 A1 | 2/2015 | Ananthakrishnan et al. |
| 2015/0057044 A1 | 2/2015 | Altman |
| 2015/0347725 A1* | 12/2015 | Ben Ari ................. G06F 21/31 |
| | | 726/19 |
| 2015/0373193 A1 | 12/2015 | Cook |
| 2016/0050203 A1* | 2/2016 | Hefetz .................... H04L 51/18 |
| | | 726/7 |
| 2017/0060779 A1 | 3/2017 | Falk |
| 2017/0163803 A1 | 6/2017 | Russell |
| 2018/0365400 A1* | 12/2018 | Lopez-Hinojosa .... G06V 20/59 |
| 2020/0008021 A1* | 1/2020 | Polychronidis ....... H04L 9/3213 |
| 2020/0267224 A1* | 8/2020 | Doane ..................... H04W 4/00 |
| 2021/0136200 A1* | 5/2021 | Li ............................ G10L 17/26 |
| 2022/0046126 A1* | 2/2022 | Grabowski ........... H04M 3/436 |
| 2023/0362298 A1* | 11/2023 | Kwok .............. H04M 3/42034 |
| 2024/0098177 A1* | 3/2024 | Edwards .......... H04M 3/42008 |

OTHER PUBLICATIONS

International Search Report corresponding to International Application No. PCT/US2020/048175 dated Dec. 31, 2020.

Jiang et al., "Integrating Internet Telephony Services", Jun. 2002, retrieved on [Oct. 29, 2020]. Retrieved from the Internet <URL: http://cs.uccs.edu/~cs525/sip/IEEEInternetComputing02_IPTelephony.pdf> entire document.

Written Opinion of the International Searching Authority issued in International Application No. PCT/US2020/048175 with Date of Mailing Dec. 31, 2020.

Android Phone Application to Detect Malicious Cell Phone Spoofing, https://cse.sc.edu/files/Laurie%20Dening.pdf, Apr. 3, 2018, 8 pages.

Mustafa et al., You Can Call But You Can't Hide: Detecting Caller ID Spoofing Attacks, http://ieeexplore.ieee.org/document/6903577/, Jun. 26, 2014, 20 pages.

Notification of Transmittal of the International Search Report and the Written Opinion of the International Searching Authority, dated May 15, 2019, issued in corresponding International Application No. PCT/US2019/021063, 14 pages.

Notification of Transmittal of the International Search Report and the Written Opinion of the International Searching Authority, mailed Jul. 10, 2019, in corresponding International Application No. PCT/US19/21062, 12 pages.

International Search Report and Written Opinion issued in International Application No. PCT/US2018/013965 with dated May 14, 2018.

International Preliminary Report on Patentability for PCT/US2020/048175 dated Mar. 10, 2022 (7 pages).

Examination Report No. 1 for Australian app. 2020340368 dated Jan. 31, 2023 (4 pages).

Extended European Search Report on EPO App. 20859570.2 dated Aug. 8, 2023 (8 pages).

Examiner's Requisition dated Mar. 28, 2024 on CA App. 3,150,456 (4 pages).

* cited by examiner

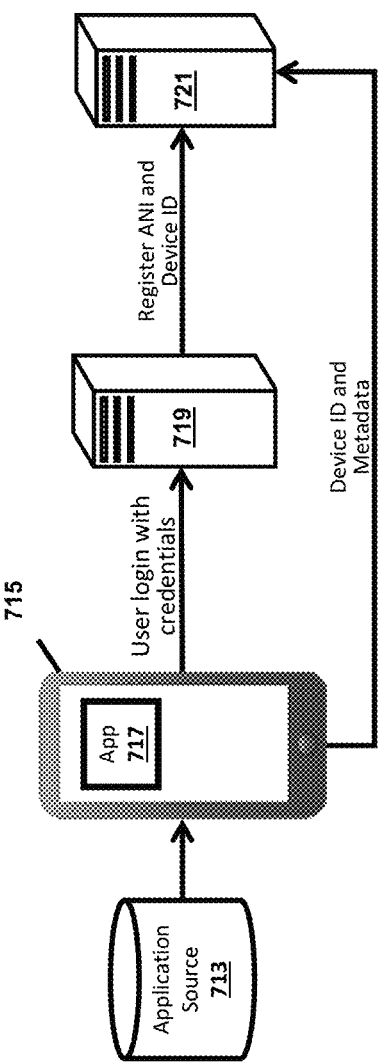
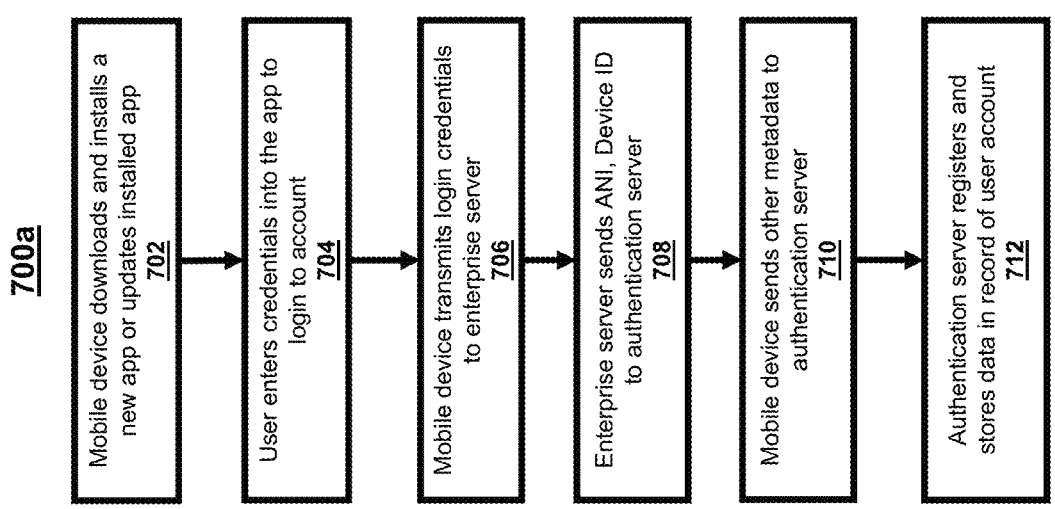
*FIG. 7B*
*FIG. 7A*

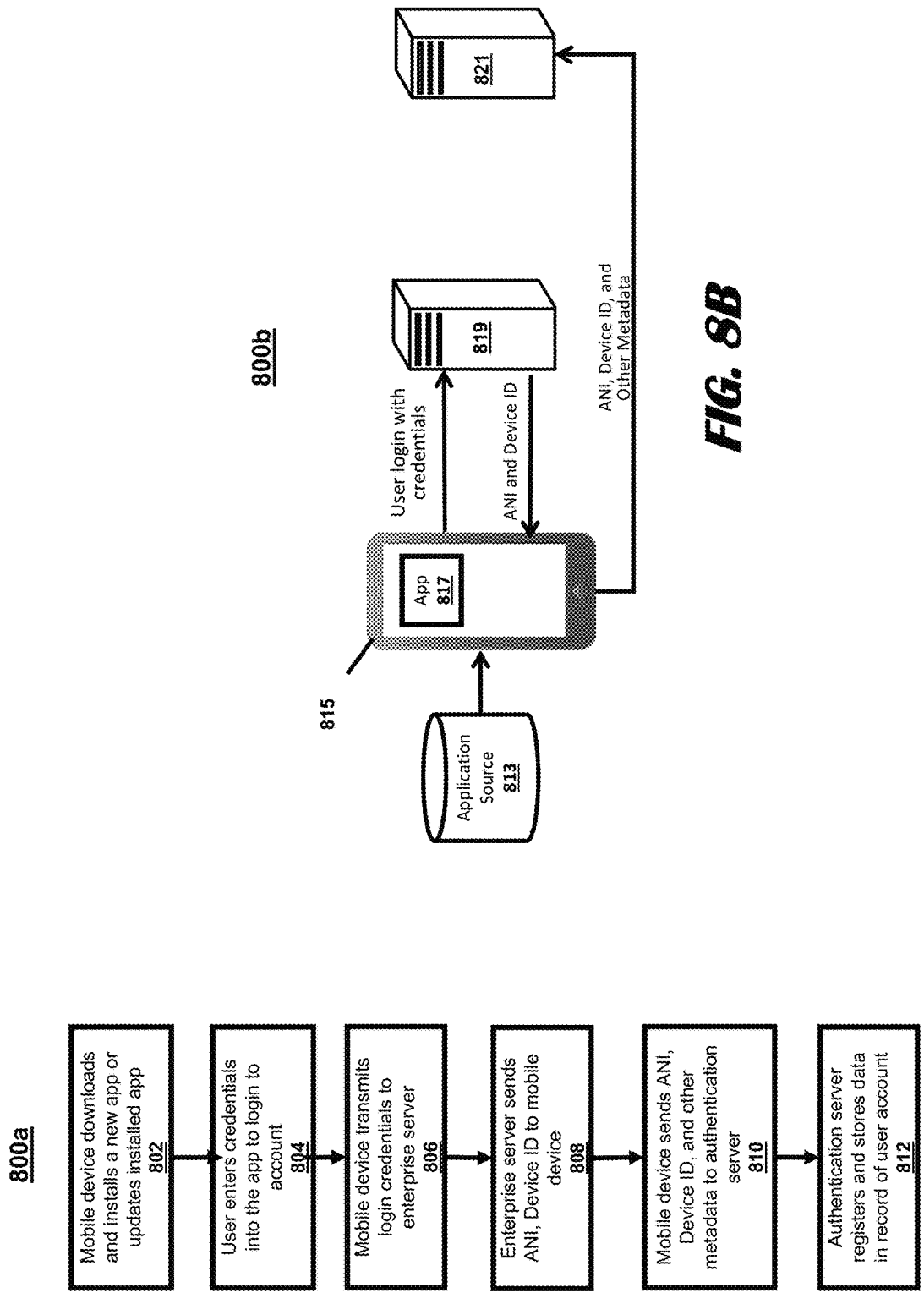

CALL AUTHENTICATION AT THE CALL CENTER USING A MOBILE DEVICE

CROSS-REFERENCE TO RELATED APPLICATIONS

This application claims priority to U.S. Provisional Application No. 62/893,033, filed Aug. 28, 2019, which is incorporated by reference in its entirety.

This application is a continuation-in-part of U.S. patent application Ser. No. 16/287,879, entitled "Silent Caller ID Verification Using Callback Request," filed Feb. 27, 2019, which claims priority to U.S. Provisional Application No. 62/640,826, filed Mar. 9, 2018, each of which is incorporated by reference in its entirety.

This application is related to U.S. patent application Ser. No. 15/872,639, entitled "Authentication Using DTMF Tones," filed Jan. 16, 2018, which is incorporated by reference in its entirety.

TECHNICAL FIELD

This application generally relates to systems and methods for authenticating calling devices or callers originating telephone calls to call centers.

BACKGROUND

As the sophistication of threats that target sensitive data and critical systems grows, the importance of robust security mechanisms becomes even more important. Identity verification is a key requirement to ensure that a request that claims to come from a certain source indeed does come from that source. Caller identification is a service provided by telephone carriers to transmit the phone number and/or the name of a caller to a callee. However, with the convergence of IP (Internet protocol) and telephony, it is easier to spoof caller identification (e.g., caller's number and/or name) without being detected by the callee.

Conventional and existing methods for verifying a user's identification (ID) may be cumbersome and tedious. For example, some conventional methods use knowledge-based questions to authenticate users. A caller trying to access a service, such as a financial institution, by making a phone call may have to answer some questions regarding private information to confirm the caller's identity. Such conventional methods may be insecure, inefficient, cumbersome, and take too much time to verify the identity of the user. In addition, such conventional methods may require the user to perform various actions that result in negative user experience. Some solutions have proposed including a mobile application installed on the mobile device that would exchange information about the user and/or device with the enterprise.

Another complication is that using information received during the telephone call, either through conversation with an agent or through caller interactions with an interactive voice response (IVR) system, is that the telephone communication channel is growing increasingly untrustworthy as techniques for exploiting vulnerabilities, including spoofing information and social engineering, grow more sophisticated.

SUMMARY

What is therefore needed is a convenient way to identify and authenticate callers with a mobile application and is less susceptible to spoofing or other exploits present in an inherently untrustworthy telephony channel. It would be beneficial to have a mobile application that aids in authentication processes for authenticating calls to a call center or other enterprise, where the call and certain information about the call is received through a telephony channel, while certain authentication information may be received through a data channel, which can be made more secure than the telephony channel.

Disclosed herein are systems and methods capable of addressing the above described shortcomings and may also provide any number of additional or alternative benefits and advantages. Embodiments described herein provide for systems and methods that authenticate inbound calls to a call center using a mobile application installed on the mobile device of known, trusted, or otherwise registered users. By leaning on the trust built into a data channel used by the mobile application, this system helps transfer the trust built into the data channel to the telephony channel. Certain types of authentication information can be received through the telephony channel, as well. But the mobile application associated with the call center system may provide additional or alternative forms of data through the data channel. The system may send requests to a mobile application of a device to provide information that can reliably be assumed to be coming from that particular device, such as a state of the device or a user's response to push notification.

In one embodiment, a computer-implemented method comprises receiving, by a computer via a first communication channel, an indication of an inbound call, the inbound call purportedly originating from a registered caller; transmitting, by the computer, one or more requests to a registered device associated with the registered caller, a first request comprising a message notification configured to display a confirmation element at a graphical user interface of the registered device; and receiving, by the computer via the second communication channel, one or more responses to the one or more requests from the registered device, the one or more responses including a first response to the first request received according to an input to the confirmation element; and executing, by the computer, an authentication routine to authenticate the inbound call using the one or more responses for the one or more requests.

In another embodiment, a system comprises a database configured to store a plurality of data records associated with a plurality of registered users; and a computer comprising a processor. The processor of the computer is configured to receive, via a first communication channel, an indication of an inbound call, the inbound call purportedly originating from a registered caller; transmit one or more requests to a registered device associated with the registered caller, a first request comprising a message notification configured to display a confirmation element at a graphical user interface of the registered device; and receive, via the second communication channel, one or more responses to the one or more requests from the registered device, the one or more responses including a first response to the first request received according to an input to the confirmation element; and execute an authentication routine to authenticate the inbound call using the one or more responses for the one or more requests.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIGS. 7A-7B show an enrollment process, according to an embodiment.

FIGS. 8A-8B show an enrollment process, according to an embodiment.

DETAILED DESCRIPTION

Figure 1:
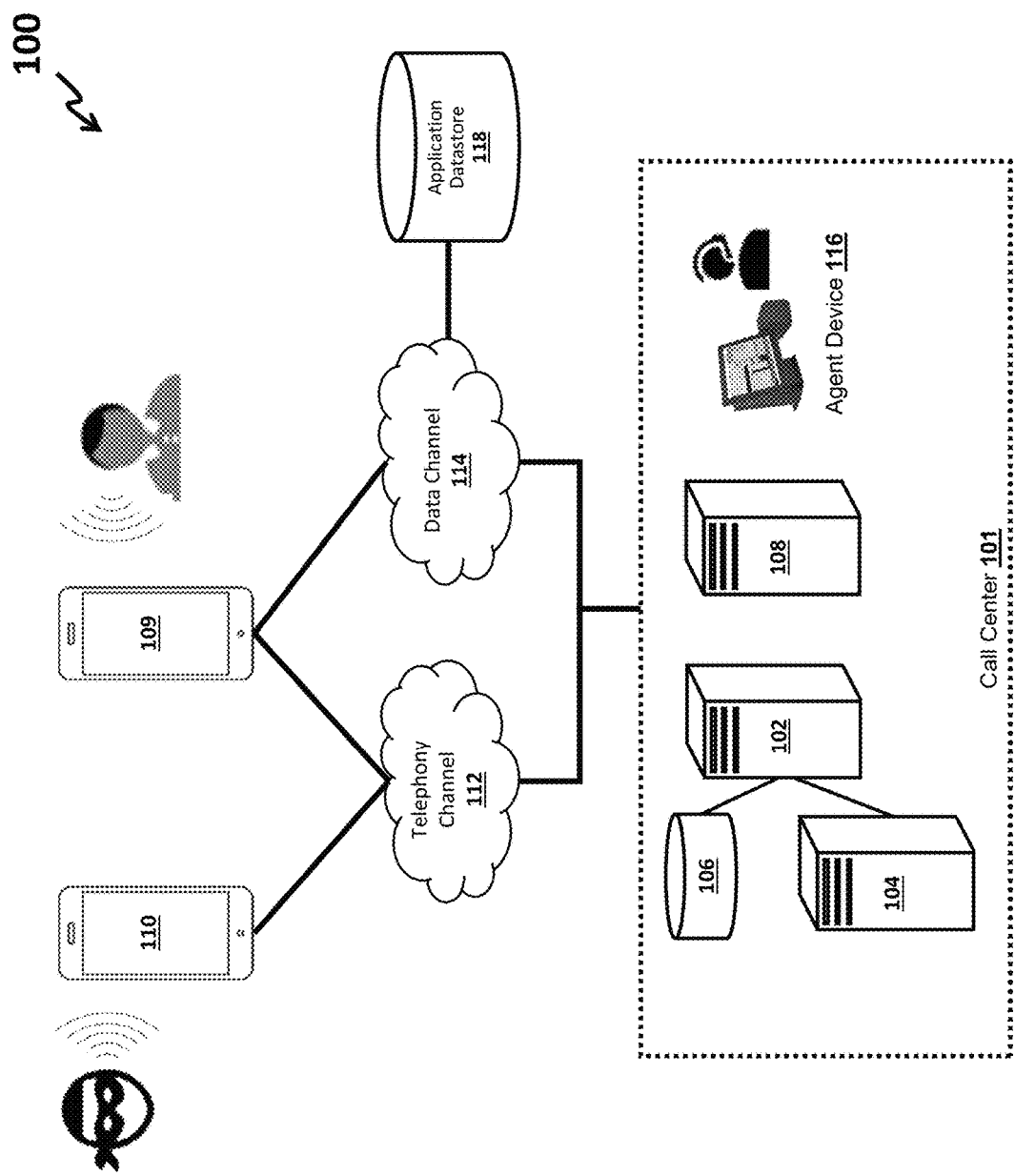
FIG. 1 shows components of a system configured for call authentication, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

With the ever-changing topology of the telephony channel (sometimes referred to as a "call channel"), techniques and tools for spoofing telephone calls to call centers or other enterprises grow more numerous and easier to deploy. As a result, the telephony channel is inherently untrustworthy. In addition, it is becoming harder to authenticate callers while maintaining the usability of the system by callers and call center agents.

The system disclosed herein builds on the trust of a data channel for the telephony channel. Certain types of authentication information can be received through the telephony channel, as well. But the mobile application associated with the call center system may provide additional or alternative forms of data through the data channel. The system may send requests to a mobile application of a device to provide information that can reliably be assumed to be coming from that particular device, such as a state of the device and/or a user's response to push notifications. In some cases, the authentication processes may be based on quantity and quality of matches between certain metadata or attributes expected to be received from a given device as compared to the metadata or attributes received.

In addition, system requests for authentication information may be transmitted to a mobile application associated with the call center system and installed on a registered device. Devices that are not executing the mobile application are inhibited or prohibited from adequately communicated with the components of the system. For instance, certain requests for authentication information are sent to the mobile application on a registered device. If an imposter calls from an imposter device purporting to be a registered user, then the authenticating request is still sent to the mobile application of the registered user. The requests sent to the mobile application may include a push notification or text message, which prompts the registered user for a response via a graphical user interface (GUI) to indicate whether that registered user is attempting to access the call center system. An element of the GUI could allow the user to immediately report fraud, which provides convenient and secure protection from spoofing or other forms of social engineering attacks directed to call centers. In some cases, the affirmative or negative response may be all that is needed to authenticate the call, while other cases may require additional types of information. In some cases, the system may generate one or more probabilistic scores, in addition or as an alternative, a sequence of comparative matches between observed information and expected information.

Several aspects of the technology described herein mention that a call center system sends requests for authentication information to a "registered device," where relying upon registration may be preferable in some circumstances. But in some circumstances, it may not be possible or available. The system may execute various forms of fraud analysis processes to generate one or more predictive probabilistic fraud scores. In this way, patterns of previously and recently received information can be used to predict the likelihood that a device that has originated a current call to the call center is the expected or appropriate device. Devices may be enrolled into, registered with, or otherwise identified by the call center system. In some implementations, the user does not even have to explicitly verify or enroll their identity to call center system. This may be accomplished manually, when a user downloads a mobile application. Enrollment, however, may also be accomplished passively or automatically when the system determines that an unenrolled or otherwise unknown device has provided device identification information with sufficient consistency between data entries and over time.

Illustrative System

FIG. 1 shows components of a system 100 configured for call authentication, according to an illustrative embodiment. The illustrative system 100 comprises a call center system 101, caller devices 109, 110, and an application datastore 118. The components of the system 100 may communicate through one or more communication channels 112, 114, such as a telephony channel 112 or data channel 114, which may include one or more public and private networks. In operation, callers use the caller devices 109, 110 to place telephone calls to the call center 101. When an indication of an inbound telephone call is received at the call center system 101, software-based authentication processes are executed to determine whether the caller device 109, 110 is a registered device 109 with (or otherwise trusted by) the call center 101, or whether the caller device 109, 110 is an imposter device 110 (or otherwise untrusted by the call center 101).

It should be appreciated that although one instance of each device is shown in FIG. 1, embodiments are not so limited and may include any number of the various devices. In addition, embodiments may implement the various processes and tasks described herein through additional or fewer devices than what are described herein. For instance, other embodiments may incorporate an authentication server 104 into an enterprise server 102 and still fall within the scope of this disclosure.

The system 100 includes any number of communication channels 112, 114, such as the telephony channel 112 and the data channel 114, which host various types of communication exchanges between caller devices 109, 110 and the call center system 101.

The telephony channel 112 may host device communications that are based on telephony protocols and comprises any number of devices capable of conducting and hosting telephonic communications. Non-limiting examples of components of the telephony channel 112 may include public exchanges (PBX), telephony switches, trunks, integrated services digital network (ISDN), public switch telephone network (PSTN), and the like.

In operation, the call center system 101 may receive inbound calls from caller devices 109, 110 via the telephony channel 112. Inbound calls may be received at or routed to an enterprise server 102, an IVR server 108, an agent device 116, or other device of the call center system 101 capable of managing inbound calls. In some cases, devices of the call center system 101 may capture certain overhead metadata about the caller device 109, 110 or the inbound call, where such metadata is received via the telephony channel 112. In addition, the caller may provide information about the caller or the caller device 109, 110, which is used to, for example, route the inbound call or authenticate the call.

The data channel 114 may host device communications that are based on non-telephony, inter-device commutation protocols, such as TCP/IP, and comprises any number of devices capable of conducting and hosting networked communications. Non-limiting examples of components of the data channel 114 may include routers, network switches, proxy servers, firewalls, and the like.

In operation, the call center system 101 may receive information about the caller device 109, 110 or user inputs via the telephony channel 112. As shown in FIG. 1, a registered device 109 may communicate with the call center system 101, while imposter device 110 is unable to because the imposter device 110 is not properly configured. In some cases, this incapability is due to the imposter device 110 not having proper configurations, certain locally installed software, or not having certain credentials. In some embodiments, registered devices 109 execute a software application associated with the call center system 101 that enables the registered device 109 to communicate with the call center system 101 via the data channel 112.

The call center system 101 may prompt callers or caller devices 109, 110 for certain information. In some cases, the requests for the information are verbally provided to a caller during a discussion with the call center agent. The call center agent may then enter the responses into the agent device 116, which forwards the responses to the authentication server 104. In some cases, requests may also be sent to the caller device 109, 110 via the telephony channel 112. For instance, the IVR server 108 may request the caller to enter or speak certain information. And in some cases, requests may be transmitted to a registered device 109 via a data channel 114. The authentication server 104 (or other device of the call center system 101) uses certain information received in the responses in order to perform various processes, such as authentication or registration.

The call center system 101 may request various types of information from the registered device 109 via the data channel 114. Non-limiting examples may include a request for a state of the registered device 109, a request for one or more attributes of the registered device 109 or other predetermined types of data, and a request that includes a message notification for the registered user. In some implementations, the message notification may include a push notification that is associated with a mobile application associated with the call center system 101. The registered device 109 may install and execute a mobile application that enables the registered device 109 to receive and respond to these requests via the data channel 114. Because imposter device 110 will not have the mobile application, the imposter device 110 may be inhibited from receiving the requests for information or adequately responding to the requests.

As mentioned, some information requests include message notifications sent to the registered device 109. The message notifications are configured to elicit a user input via a graphical user interface (GUI) presented on the registered device 109. Like several other types of information requests, the message notifications may be sent to the registered device 109 via the telephony channel 112 or the data channel 114, while responses are received at the call center system 101 via the data channel 114. Message notifications may be in the form of push notifications that are associated with a mobile application executing on the registered device 109 and generated according to the operating system and protocols of the registered device 109. These push notifications are transmitted to the registered device 109 via the data channel 114. The message notification includes a GUI comprising interface elements that prompt the user to select a response. The selected response is then transmitted to the call center system 101 via the data channel 114. Additionally or alternatively, message notifications may be in the form of text messages that are generated according to, for example, short message service (SMS) message protocol, multimedia message service (MMS) message protocol, rich communication service (RCS) message protocol, or the like. These text messages may be transmitted to the registered device 109 via the telephony channel 112 according to one or more carrier and device protocols. Text messages may include an interactive link that, when actuated by a user, instructs the operating system of the registered device 109 to invoke the mobile application. The mobile application is then executed, which presents the GUI having the selectable interface elements. As before, the selected response is then transmitted to the call center system 101 via the data channel 114.

The call center system 101 is a physical and logical network infrastructure that includes various devices for telephony and data communications with caller devices 109, 110 via the communication channels 112, 114. The component devices of the call center 101 may, for example, receive inbound calls, route the inbound calls to appropriate call center agent devices 116, and perform various authentication or analytics processes. The devices of the call center system 101 may communicate with one another through one or more public or private networks of the network infrastructure. In the illustrative system 100 of FIG. 1, the call center system 101 comprises the enterprise server 102, an authentication server 104, a call center database 106, the IVR server 108, and the agent computing device 116.

It should be appreciated that components of the call center system 101 are described as separate components for ease and clarity. Embodiments may aggregate or parse the operations of the components described into fewer or more components. For example, the enterprise server 102 may be described as a distinct component from the authentication server 104 in FIG. 1, but other embodiments may partially or entirely incorporate the features of the enterprise server 102 into the authentication server 104.

The enterprise server 102 may receive call data and manage data flow for inbound calls received at the call center system 101 and for data communication with mobile applications installed on registered caller devices 109. The enterprise server 102 may be any number of computing devices comprising a processor, device hardware, and machine-readable software and capable of performing the various processes and tasks described herein. Non-limiting examples of the enterprise server 102 may include a server computer, a desktop computer, a laptop computer, a tablet computer, and the like.

The enterprise server 102 may be situated as a logical central hub for components of the call center system 101. For example, an inbound call received via a telephony channel 112 may be received by the enterprise server 102 and routed to the IVR server 108 or an agent device 116. As another example, the enterprise server 102 could execute various software applications that monitor one or more "legs" of the call lifecycle. In this example, the enterprise server 102 could trigger or otherwise invoke the authentication server 104 to authenticate the legitimacy of the inbound call and/or authenticate the caller based on information from the caller device 109, 110. As another example, software on a monitoring device of the call center system 101 (e.g., firewall, router, switch, computing device, server) could be configured to detect an inbound call before or after the inbound call is routed to the IVR server 108 or agent device 116. In this example, the monitoring device then initiates a request to the enterprise server 102 to authenticate the inbound call, caller, or calling device 109, 110. The enterprise server 102 may receive and forward the authentication request to the authentication server 104. As noted, it should be appreciated that in other embodiments the enterprise server 102 and the authentication server 104 could be combined into a single server.

The enterprise server 102 may receive and manage communications with mobile applications of registered caller devices 109 via the data channel 114. For example, information exchanges between the mobile application of the registered device 109 and the authentication server 104 may traverse the various communications networks according to instructions from the enterprise server 102. The enterprise server 102 may detect or trigger processes, such as an authentication or registration process executed by the authentication server 104. In some implementations, the enterprise server 102 may also manage registration operations for new mobile application installations for new registered devices 109 of the system. In such implementations, the enterprise server 102 may receive certain types of data associated with a registered device 109, and store this data for later use when authenticating calls purportedly originating from the registered device 109.

The authentication server 104 may receive various types of call data of an inbound telephone call for authenticating telephone calls and execution instructions from other devices of the call center system 101 (e.g., enterprise server 102, IVR server 108, agent device 116). The authentication server 104 executes various processes for registering and authenticating inbound phone calls received from caller devices 109, 110. It should be appreciated that the authentication server 104 may be any number of computing devices comprising a processor, device hardware, and machine-readable software and capable of performing the various processes and tasks described herein. Non-limiting examples of the authentication server 104 may include a server computer, a desktop computer, a laptop computer, a tablet computer, and the like.

The authentication server 104 executes machine-readable software instructions for executing authentication routines and registration routines. In operation, the authentication server 104 receives information about caller devices 109, 110 from various data sources of the system 100, such as the enterprise server 102, call center database 106, IVR server 108, agent device 116, and caller devices 109, 110. The authentication server 104 receives caller identifier information, determines a device identifier associated with the caller identifier, and requests information from the registered device 109 identified by the device identifier. The authentication server 104 then determines whether the data of the responses received via the data channel 114 match expected data values, which may be pre-stored values or dynamically determined by the authentication server 104 during the call.

Caller identification information includes various types of data values that identify a caller or can be used as part of the identity of the caller. In some cases, caller identification data expressly identify the caller (e.g., name, username, caller identifier) or an aspect of the caller identity (e.g., email address, location); or the caller identification information may include data that can be used to derive or determine the identity of the caller (e.g., passphrase, pin). Non-limiting examples of types of caller identification data may include a name, authentication credentials (e.g., username, password, passphrase, pin), biometric data, account number, account identifier, email address, cryptographic tokens (e.g., encryption keys, encryption certificate, hashed key), social security number, physical address, date of birth, and phone number, among other types of information that can be used to identify a user/caller who is registered with the call center system 101 and who has purportedly originated an inbound telephone call.

Device identification information includes various types of data values that identify registered device 109 or can be used as part of the identity of the registered device 109. In some cases, device identification data expressly identify the registered device 109 (e.g., device identifier, computer name, MAC address) or an aspect of the registered device 109 (e.g., IP address, Automatic Number Identification (ANI)); or the device identification information may include data that can be used to derive or determine the identity of the registered device 109. Non-limiting examples of types of device identification data may include a device identifier, a MAC address, an IP address, a system-generated universally unique device identifier (UUID), an identifier for advertising (IDFA), and a Google advertising identifier (AAID), among other types of information that can be used to identify the registered device 109 that has purportedly originated an inbound telephone call.

Continuing with the authentication server 104, in some implementations the authentication server 104 sends query to the caller device 109, 110 to confirm whether the caller device 109, 110 has a certain mobile application associated with the call center system 101. The authentication server 104 may, for example, transmit a request message to the caller device 109, 110 that the mobile application detects and transmits a brief response accordingly. If the caller device 109, 110 does not have the mobile application, then the authentication server 104 takes a certain remedial action, such as halting or rejecting the inbound call, routing the inbound call to a call center agent, invoking an alternative authentication process, or executing a registration routine. Additionally or alternatively, the enterprise server 102 may query a listing or data records of registered devices 109 having the mobile application associated with the call center system 101 to determine whether the caller device 109, 110 has the mobile application of the call center system 101.

The call center database 106 may store various data records associated with registered devices 109. The call center database 106 may be updated by the authentication server 104 or other devices to enroll new registered devices 109 or queried by the authentication server or other device when executing various authentication processes. The call center database 106 may be hosted on any number of computing devices comprising a processor, device hardware, and machine-readable software and capable of performing the various processes and tasks described herein.

The database records in the call center database 106 include various types of data about registered callers and registered devices, such as caller identification information and device identification information. The data records for a registered caller may indicate other information employed by the system 100 for authentication processes, such as preferred mechanisms for communication (e.g., email, text message) and ways to contact registered device 110 when transmitting requests for certain information.

The IVR server 108 is a computing device that manages the data flow for inbound calls that navigate an IVR application, which in the illustrative system 100 is executed by the IVR server 108. It should be appreciated that the IVR server 108 may be any number of computing devices comprising a processor, device hardware, and machine-readable software and capable of performing the various processes and tasks described herein. Non-limiting examples of the IVR server 108 may include a server computer, a desktop computer, a laptop computer, a tablet computer, and the like.

In operation, when the caller initiates a call to the call center system 101, the inbound call traverses over the telephony channel 112 and is routed to the IVR server 108. The IVR server 108 can determine how to route the inbound call, such as determining which call center agent should handle the content of the call. In some cases, the IVR server 108 can capture and forward certain information that can be employed for authentication purposes. For example, the IVR server 108 may prompt the caller to input certain caller identification information, which may indicate who the caller purports to be.

It should be noted that in some embodiments, the system 100 does not include an IVR server 108. Rather, inbound calls may be routed directly to an agent device 116. Similarly, even for embodiments comprising an IVR server 108, in some circumstances the nature or content of the inbound call may forgo the IVR server 108 and the inbound call may be routed directly to an agent device 116.

The agent device 116 is a computing device operated by an agent of the call center system 101 to handle inbound calls. The agent device 116 may include a GUI configured to display information gathered by the IVR server 108 (or any other devices) that routed the inbound call from the telephony channel 112 to the agent device 116. This information may include data fetched from the database 106, data entered by the caller during an IVR application, or data extracted from the overhead metadata of the telephony channel 112. Additionally or alternatively, the GUI may display information fetched by the agent device 116 from the database 106 or entered by the agent. In some cases, the agent device 116 may be used to manually initiate an authentication request, which the agent device 116 transmits, along with various types of information, to an authentication server 104 or enterprise server 102.

An agent device 116 may be any computing device comprising a processor, device hardware, and machine-readable software and capable of performing the various processes and tasks described herein. Non-limiting examples of the agent device 116 may include a server computer, a desktop computer, a laptop computer, a tablet computer, and the like.

The application datastore 118 may be a data service from which caller devices 109, 110 may download and install a mobile application associated with the call center system 101. In some cases, the datastore 118 may be hosted by public data service, such as Apple App Store® or Google Play®. And in some embodiments, the datastore 118 is a private data service hosted on a privately available application server. In operation, caller devices 109, 110 may navigate to, for example, a web-based address for the datastore 118 from which caller devices 109, 110 may download the mobile application.

Caller devices 109, 110 can be any electronic device comprising a processor and software, and capable of performing the various tasks and processes described herein, which includes the capability of communicating with a call center system 101 via a telephony channel 112 and via a data channel 114. A caller device 109, 110 could be, for example, a cellular phone (sometimes called a "smartphone" or "mobile phone"), a tablet device, a laptop computer, or any other computing device. It should also be appreciated that in some instances, the telephony channel includes voice-over-IP (VoIP) communications as initiated and executed by the caller device 109, 110. It should be appreciated that embodiments are not necessarily limited to mobile applications or mobile electronic devices, but may rather include fixed devices (e.g., laptop computer, desktop computers), telephones (e.g., unified communications phones, application and VoIP-enabled telephones), or telephony software (e.g., softphone) executed on a fixed device.

Authentication

Figure 2:
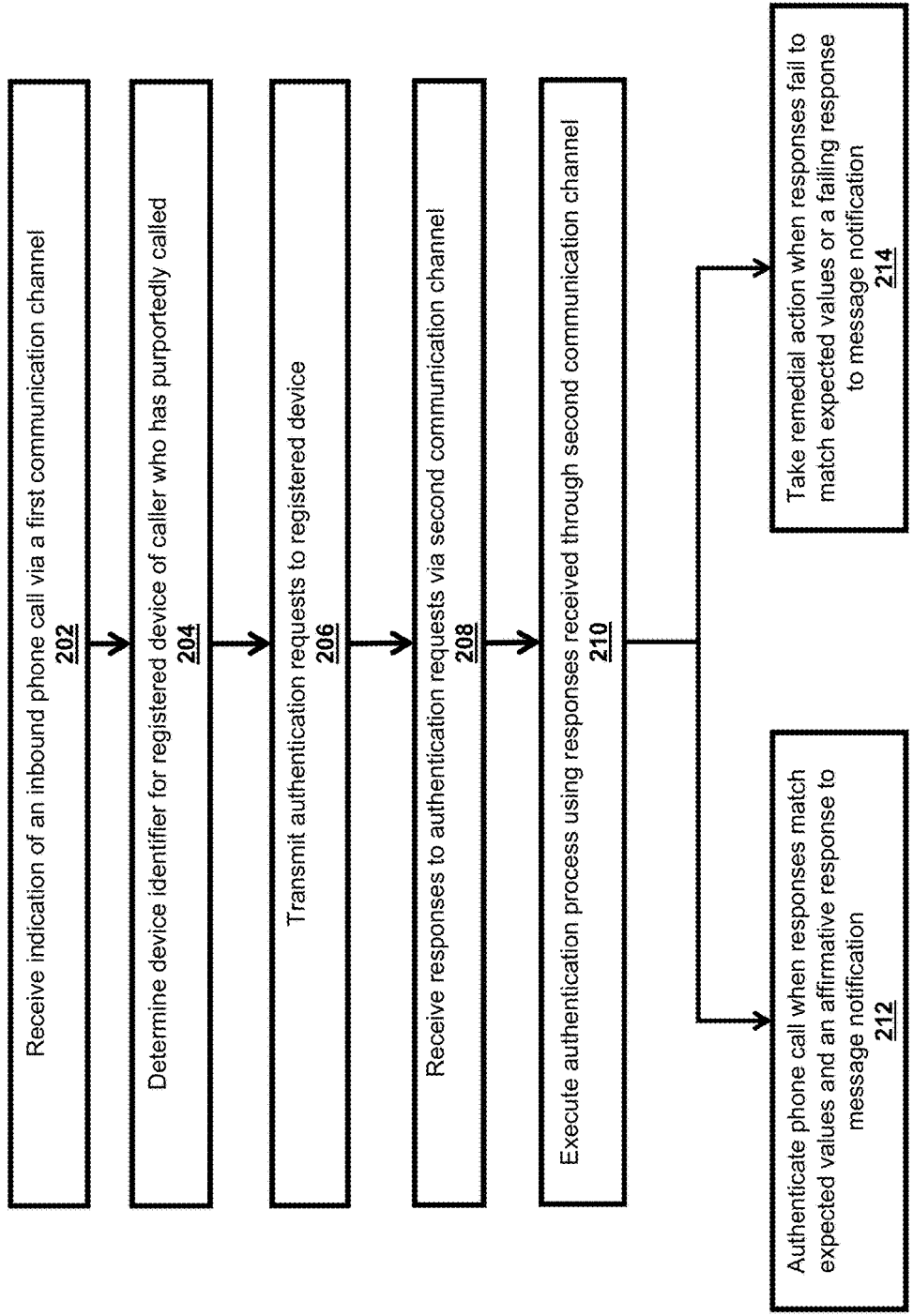
FIG. 2 shows execution steps of a method for authenticating a phone call using multiple communication channels, according to an embodiment.

FIG. 2 shows execution steps of an illustrative method 200 for authenticating a phone call using multiple communication channels, according to an embodiment. In the illustrative method 200, a caller places a telephone call to a call center system that executes various processes to authenticate the telephone call. The call center system includes one or more databases containing database records with information about users or devices registered with the call center system. The caller of an inbound call provides information that indicates the caller purports to be a registered user.

It should be appreciated that additional or alternative devices may be implemented to execute the various steps of the illustrative method 200. In addition, the illustrative method 200 is described as using two communication channels, though other embodiments may implement more. It should be further appreciated that other embodiments may include additional or alternative steps, or omit certain steps, from those shown in FIG. 2 and still fall within the scope of this disclosure. Although the steps of the method 200 are described as being executed by the authentication server, is should be appreciated that additional or alternative computing devices may be involved in executing the various steps.

In step 202, an authentication server of a call center receives an indicator of an inbound phone call received at the call center through a first communication channel, such as a telephony channel. The indicator may be an event or data that triggers the server to execute various authentication processes, which are based upon responses received from caller devices through a second communication channel. The indicator can include information (e.g., name, address, account number, caller identifier) about the caller or the caller device that the authentication server references for later steps of the method 200.

In some embodiments, the call indicator may be a user input, entered by the caller, call center agent call center, or another end-user. The caller, purporting to be a registered user of the call center system, could enter or provide information about the caller, caller device, or registered user. The caller can provide such identifying information to an IVR server or call center agent, via the telephony channel, through spoken interactions or keypresses at the caller device. The IVR server or call center agent may invoke the authentication server to execute various authentication processes using the information provided by the caller.

The call center system receives a caller identifier with the call indicator. The authentication server may use the caller identifier to later determine a device identifier, as in step 204. In some cases, the caller identifier may be received at the IVR server based on caller inputs responding to IVR prompts. For instance, the caller identifier may be a user name, account number, or other identifying data that the caller enters in response to IVR prompts. The IVR server may then forward that information to the authentication server. In some cases, the caller identifier may be received as a function of the telecommunications systems, carriers, and protocols. For example, a caller identifier may be the Caller ID metadata, the ANI, or any other type of telecommunications overhead metadata. And in some cases, the caller identifier may be entered by a call center agent. As mentioned, the call center agent may receive the inbound call directly or through an IVR system and enter the caller identifier data into a GUI according to the verbal information conveyed by the caller. At some point in the conversation, the call center agent may manually submit the ongoing call to the authentication server and instructions to execute the authentication processes.

The caller identifier may be explicit in the call indicator (or other data received by the call center system) or the authentication server must determine the caller identifier using the information received by the call center system. For example, the information received from the caller through the telephony channel may be an encrypted, hashed, or other type of encoded version of the caller identifier. The authentication server may apply the appropriate algorithms to derive the caller identifier from the information provided. As another example, the information received may include a database value that maps to database of record of the registered user containing the caller identifier. For instance, the information received via the telephony channel may include a password, passphrase or passphrases, pin, or hash of predetermined information, which the authentication server uses to query the database for the caller identifier.

Figure 3:
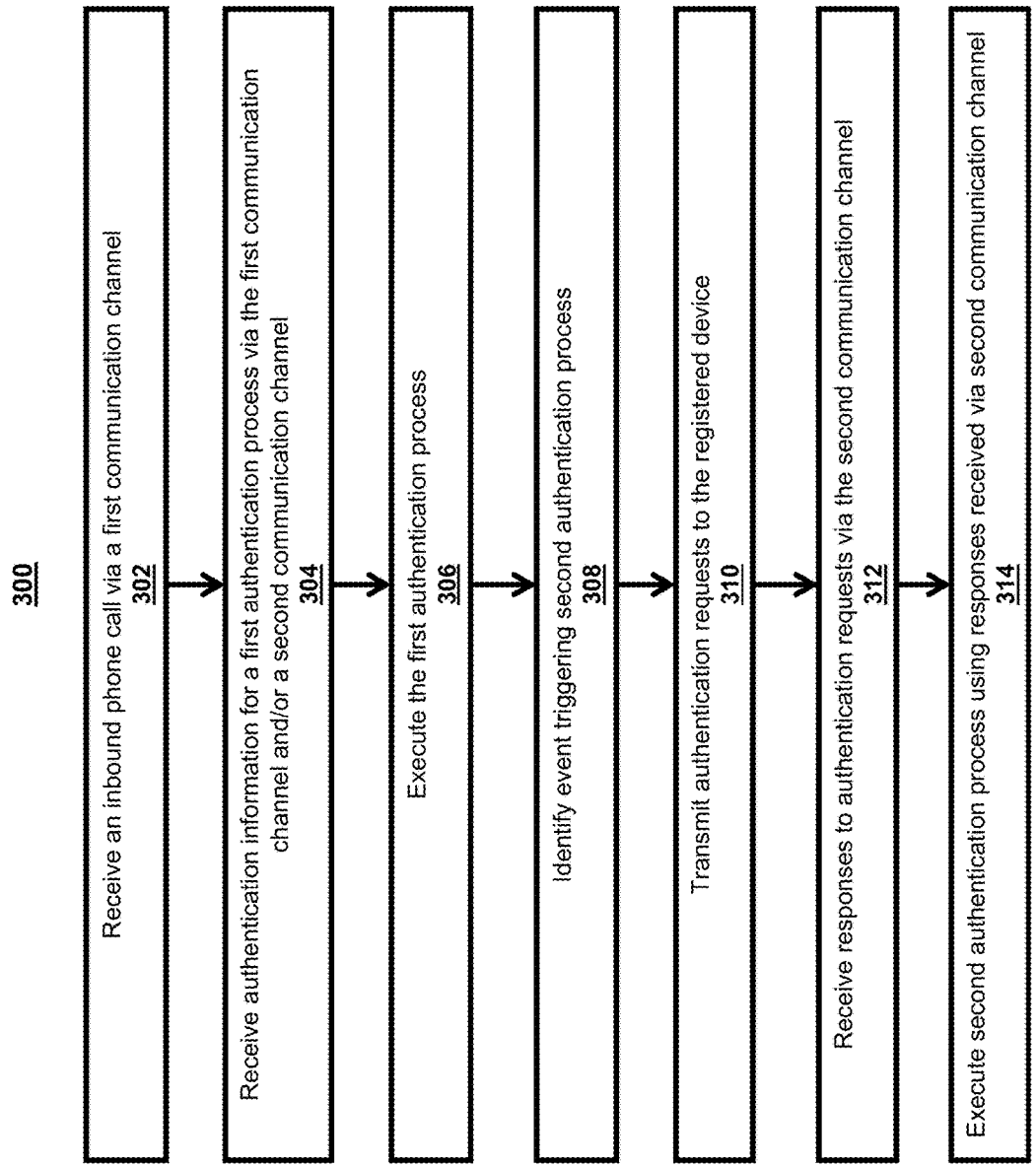
FIG. 3 shows execution steps of a method for authenticating a phone call using multiple communication channels, according to an embodiment.

In some embodiments, such as the illustrative method 300 of FIG. 3, the call center system employs multi authentication processes. For instance, the call center system may implement an optional precursor authentication process prior to the method 200 of FIG. 2. With respect to step 202, a successful authentication of the inbound call during a preceding authentication process may effectively serve as a call indicator that triggers the following steps of the method 200 of FIG. 2.

In step 204, based on the caller identifier, the authentication server identifies a device identifier for a registered device associated with the registered user. A database record, such as a database record for the registered user, can include a device identifier that identifies a device registered to, or otherwise previously associated with, the registered user. When the authentication server identifies the caller identifier for the registered user, as in step 202, the authentication server then identifies or otherwise determines the device identifier associated with that registered user.

In step 206, the authentication server transmits one or more authentication requests to the registered device according to the device identifier. The authentication requests, transmitted by the authentication server, may be requests for certain types of information about the registered device. Non-limiting examples may include requests for the state of the device, requests for certain attributes about the device, or a message notification configured for human interaction through a GUI of the registered device. For instance, during an enrollment process, the authentication server may receive or generate certain types of data associated with the registered device (e.g., MAC address, UUID) or the registered user (e.g., user credentials), which are then stored as attributes of the device into the database.

The authentication requests may be transmitted through a telephony channel or through a data channel. As mentioned, a message notification may include an app-based push notification configured to be displayed by a mobile application installed on the registered device. Such push notifications are transmitted through a data channel. When the registered user clicks the push notification or otherwise executes the mobile application, the mobile application presents a GUI comprising one or more GUI elements prompting the registered user to input whether the registered user is involved with the current inbound call. Additionally or alternatively, the message notification may be an SMS or MMS (collectively, "text message") that the authentication server or other device of the call center system transmits via a telephony channel. The text message may include a clickable link instructing the mobile device to invoke the locally-executed mobile app. When the registered user clicks the link, the mobile application is executed and a GUI is presented with a GUI element, which could be a confirmation element, allowing the registered user to input and confirm whether the registered user is involved with the current inbound call.

The authentication requests may further include requests for certain information about the registered device, such as the device state or other predetermined types of data that were captured or generated during an enrollment process for the registered device. During authentication, the mobile application may gather the corresponding information by, for example, querying the local storage or software program logically situated on top of the operating system of the registered device (e.g., middleware capable of retrieving information from the operating system on behalf of the mobile application). For example, the local storage may contain a UUID assigned to the mobile application during registration and the operating system or other firmware component of the registered device may indicate (for the mobile application) the state of the caller device during the call.

In step 208, the authentication server receives, from the registered device, responses to each of the authentication requests via the second communication channel (e.g., a data channel). As mentioned, the registered device executes a mobile application associated with the call center system. The mobile application may, for example, gather certain information according to the requests from the local storage or operating system of the registered device and receive a user input via a GUI, and then transmit the responses to the authentication server via the second channel.

In step 210, the authentication server executes a software-based authentication routine that uses the responses received from the registered device in order to authenticate the inbound call. The responses may include responses to the message notification, responses to the state requests, and responses to the attribute requests. The authentication server may compare the response information against the expected information to determine whether the information matches. If the information fails to match, then the authentication fails.

The authentication server may determine there is a match according to one or more algorithmic operations. In some embodiments, a match is identified based upon straightforward comparisons of the data in the responses against the expected data values. In such embodiments, the amount of matching data may vary. For example, the authentication server may implement a strict threshold requiring that each of the compared data values match or that certain critical data values match. As another example, the authentication server may implement a less-stringent threshold that requires some threshold number of matches, thereby allowing for some number of mismatches or variations.

In some embodiments, a match is based upon heuristic or threshold scoring rules. In such embodiments, a score may be assigned to certain identified matches based upon the criticality of the data field and/or based upon the precision of the match. The scores maybe may combined according to one or more mathematical operations into a matching score. If the matching score satisfies a threshold, then the authentication server has determined the values in the response match the expected values.

In some embodiments, the authentication server may apply one or more machine-learning algorithms for determining whether the data in the responses matches expected data. In such embodiments, the data values received from the registered device may be employed for training a machine-learning model or for various operation related to developing the model. Models may be generated and trained for each particular registered caller and/or for categories of callers, using supervised or unsupervised machine-learning algorithms. As an example, feature vectors for each of the registered users can be generated from the data records of registered users, which, in some cases, could include a label indicating that the feature vector is associated with the registered user. The models can be trained against one or more feature vectors of one or more registered users according to the particular types of data being modeled. For instance, certain personalized user identifying information (e.g., social security number, UUID) can be used to generate and/or train models for a particular registered user; and certain categorical user identifying information (e.g., carrier, country location) can be used to generate and/or train models for a collection of registered users. A feature vector can likewise be extracted from the data values received from the inbound call associated with the caller. The one or more trained models can be applied to the feature vector extracted for the caller to generate a score. If the score satisfies a threshold, then the caller is determined to be the registered user. Additionally or alternatively, the authentication server may apply clustering techniques to certain data values of the registered user to identify the types of data critical to the authentication when generating/updating the feature vector for the registered user to train the model for the registered user. Clustering may also be implemented, additionally or alternatively, to determine an authentication score by determining whether the distance from clustered data values or feature vector extracted for the registered user satisfies a threshold from the data values or feature vector extracted for the caller.

It should be appreciated that these examples of authentication based upon the data of the registered user and the caller are merely illustrative and non-limiting. Variations or well-known algorithmic approaches for authentication using such data may be within the scope of this disclosure.

The response to the message notification is a user input that indicates whether the registered user is actually the caller who initiated the inbound call. If the user input indicates that the registered user did not initiate the call, then the authentication fails.

In optional step 212, the authentication server authenticates the inbound phone call when responses match expected values and include an affirmative response to message notification. The authentication server may route the call according to the context in which the method 200 was invoked. For example, the authentication routine may be invoked prior to routing the call to an IVR server or agent. In this example, upon successful authentication, the call is routed by the authentication server or other device of the system to the IVR server or agent. In another example, the authentication routine may be invoked by an instruction inputted at an agent device. In this example, the upon successful authentication, a successful authentication notification may be provided to the GUI of the agent device or the inbound call may be reinitiated and routed back to the agent device.

In optional step 214, the authentication server may take remedial action when the responses either fail to match expected values or a negative response to message notification is received. The remedial action may include dropping the call, rejecting the call from further routing, routing the call to an agent or fraud analyst, re-attempting the authentication routine using the same or different attributes, or attempting a different technique for authenticating the call.

FIG. 3 shows execution steps of an illustrative method 300 for authenticating a phone call using multiple communication channels, according to an embodiment. In the illustrative method 300, a caller places a telephone call to a call center system that performs multiple authentication processes in order to authenticate the telephone call. The inbound call is then authenticated using multiple iterations of call authentication processes. In the second authentication process, responses are received via the data channel and include a response to a message notification displayed at the client-side GUI.

It should be appreciated that additional or alternative devices may be implemented to execute the various steps of the illustrative method 300. In addition, the illustrative method 300 is described as using two communication channels, though other embodiments may implement more. It should be further appreciated that other embodiments may include additional or alternative steps, or omit certain steps, from those shown in FIG. 3 and still fall within the scope of this disclosure.

In step 302, the call center system receives an inbound phone call via a telephony communication channel. The call may be routed from the telephony channel to an IVR system or agent device. At a predetermined triggering event, such as when the inbound call is received, the caller may be prompted, through the telephony channel, to provide certain authentication information for a first authentication process. Additionally or alternatively, a state of the device may be queried by an authentication server.

In step 304, an authentication server receives the response information for the first authentication process. These responses may be received via the telephony channel or via a data channel. These responses may include user credentials or simplified caller identification information. In some case, these responses further include the current device state.

In step 306, the authentication server executes a first authentication routine using the state of the device and the caller identification information received in the first set of responses. The authentication server may compare the information received in the first set of responses against pre-stored or expected information, then the authentication server authenticates the phone call for a first level. If the call fails the first authentication process, the authentication server may invoke one or more remedial processes and prevents the call from proceeding.

In step 308, the authentication server (or other device of the call center system) identifies an event triggering a second authentication process. A triggering event may include, for example, a caller's attempt to access sensitive data, a caller's attempt to perform a sensitive process, or at a predetermined timing interval after the first authentication process.

In step 310, the authentication server transmits requests for authentication information to the registered device. These requests may be transmitted through the telephony channel or the data channel, and may include requests for the same or different authentication information. In addition, the second round authentication process includes a request comprising a message notification configured to be displayed at a GUI of the registered device and to receive a user input indicating the response.

In some implementations, the information received for the first authentication process may be employed for preparing the requests of the second authentication process. For example, credentials used to authenticate call for the first authentication process may include caller identification information, which the authentication server uses to fetch the device identification information or other data related the registered caller.

In step 312, the authentication server receives the second set of responses to the second round of requests via the data channel. As mentioned, the registered device executes a mobile application associated with the call center system. The mobile application may, for example, gather certain information according to the requests from the local storage or operating system of the registered device and receive a user input via a GUI, and then transmit the responses to the authentication server via the second channel.

In step 314, the authentication server executes the second authentication routine using the responses received via a data channel. The responses may include responses to the message notification, responses to a second state request, and responses to requests requiring the same or different attributes. The authentication server may compare the second set of response information against expected information to determine whether the second round of information matches. If the information fails to match, then the second authentication routine fails.

A response to the message notification is a user input that indicates whether the registered user is actually the caller who initiated the inbound call. If the user input indicates that the registered user did not initiate the call, then the authentication fails.

If the authentication server authenticates the inbound phone call in the second authentication process, when responses match expected values and include an affirmative response to message notification, then the authentication server may route the call according to the context in which the method 300 was invoked.

If the authentication server determines that the authentication fails, when the information in the second set of responses either fail to match expected values or a negative response to message notification is received, then authentication server may take remedial action. The remedial action may include, for example, dropping the call, rejecting the call from further routing, routing the call to an agent or fraud analyst, re-attempting the authentication routine using the same or different attributes, or attempting a different technique for authenticating the call.

Figure 4:
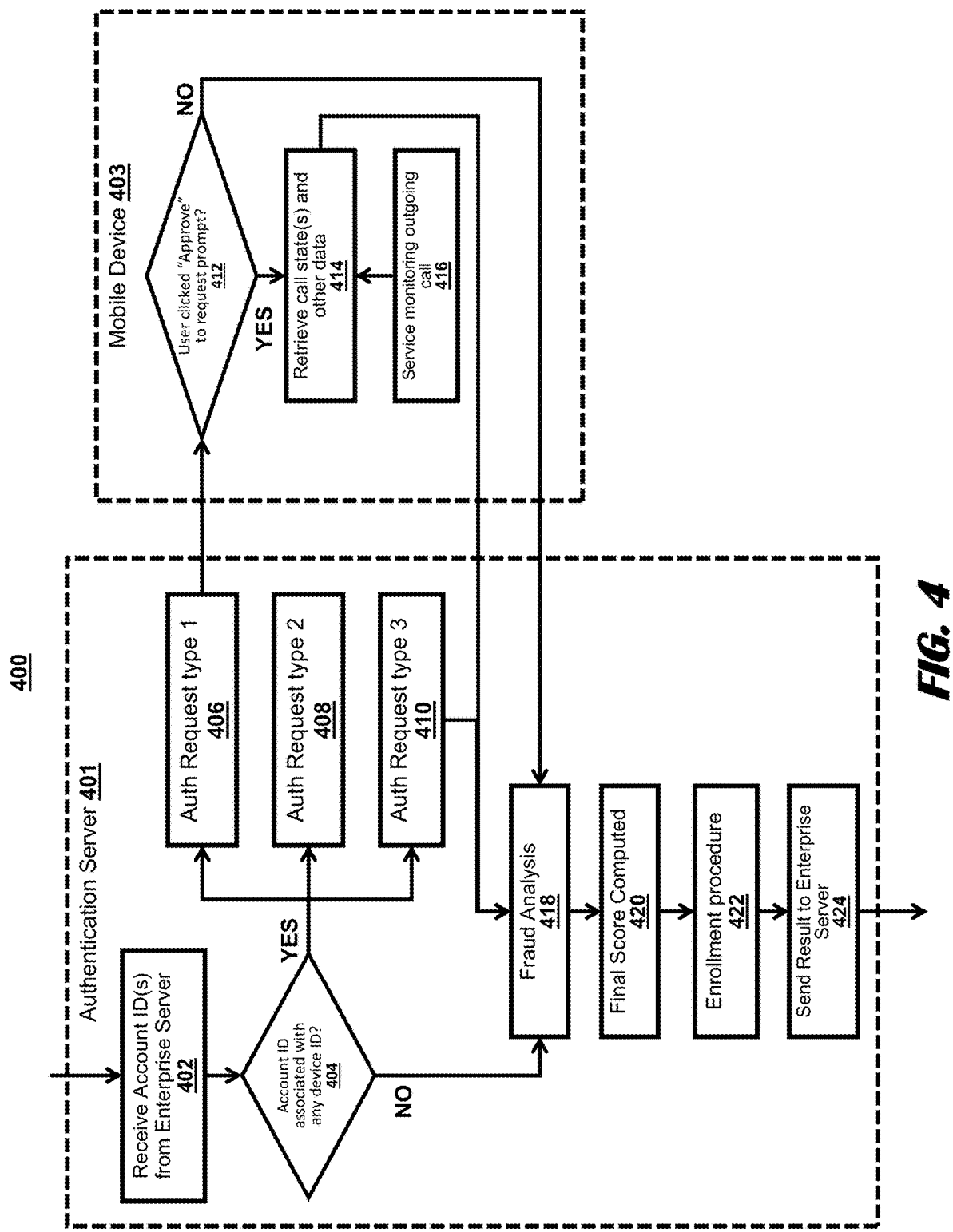
FIG. 4 shows execution steps of a method in the context of device components, according to an embodiment.

FIG. 4 shows execution steps of an illustrative method 400 in the context of device components, according to an embodiment. FIG. 4 shows that certain execution steps are executed by an authentication server 401 of a call center system, while other executed steps are executed by a mobile device 403 (sometimes referred to as a "caller device").

In the illustrative method 400, a user initiates a call from a mobile device 403. The call reaches the carrier of the mobile device 403 and then transferred to the carrier of a call center enterprise. In some circumstances, the carriers may be the same; and in some circumstances, there may be one or more carriers involved with the call. The call may be received at an enterprise server, which may be configured to initiate an authentication request for an authentication server 401 to authenticate the call before the call is answered at an IVR server. Although the illustrative method 400 mentions that authentication is initiated before the call is answered at the IVR server, it should be appreciated that this is not limiting on other embodiments. The authentication, among other operations, may be initiated or otherwise occur before or when the call is being handled at the IVR server. For instance, in some circumstances the programmatic hooks for the IVR server to execute various processes are not present before the call arrives at the IVR server. In such circumstances, the authentication might not be initiated before the call is answered at the IVR server, but rather when the IVR server has received and is handling the call. These cases nevertheless fall within the scope of this disclosure.

In step 402, an inbound telephone call arrives at the authentication server 401 from an enterprise server. The enterprise server may extract certain information about the call, which is sent to the authentication server 401 with the authentication request. For example, the ANI and other metadata may be extracted from the incoming call and is sent to the authentication server 401. Additionally or alternatively, the authentication server 401 receives an account identifier (account ID) along with the authentication request for the call. In some cases, the authentication server 401 uses the ANI as the account ID.

In step 404, the authentication server determines whether the account ID is associated with a particular device identifier (device ID) in a database. The authentication server 401 may use the ANI (or another type of data) as an account ID to check if there are any device identifier(s) in the database.

In some implementations, the authentication server 401 retrieves one or more device ID associated with that account ID and may use the device ID to sends queries to a mobile application of the mobile device 403 to check the call states of the mobile device 403. Additionally or alternatively, the authentication server may extract other stored metadata, such as a device timestamp, timezone, device ID, location, WIFI, Bluetooth, International Mobile Equipment Identity (IMEI), network or carrier information, and security information (lock/unlock feature bits indicating whether the device is locked or unlocked), among other types of data.

This information may be transmitted to a fraud analysis program, which is described with respect to steps 418-420.

Referring back to step 404, the authentication server may determine one or more type of authentication functions to be employed. In some implementations, the database record for the account ID or the enterprise server may establish a default policy for a certain authentication function, which the authentication server 401 can consider when determining the type of authentication function to implement. As shown in FIG. 4, there are three potential authentication functions to be executed, which may be selected based on various factors, such as the capabilities of the mobile device 403, recent communications or authentication attempts between the authentication server 401 and mobile device 403, or a predetermined policy for the registered user. A first authentication (type 1) function and second authentication (type 2) function transmits a message notification to the mobile device 403, prompting user interaction via a GUI of the mobile device 403. A third authentication (type 3) function determines whether the mobile application of the mobile device 403 has recently transmitted authenticating data to the authentication server 401.

In optional step 406, the authentication server 401 initiates a type 1 authentication function, in which the authentication server 401 transmits a message notification prompting a user interaction via a GUI display of the mobile device 403. In step 412, the mobile application determines whether the user clicked "approve" to the request prompt. It should be appreciated that embodiments are not limited to those indicating "approve" on the GUI but may further include any GUI element capable allowing the user to select and enter an affirmative response to the prompt displayed via the GUI. In step 414, the mobile application gathers call state or device state data, and other attribute data about the mobile device 403. As shown in step 416, the mobile application comprises an executable service that monitors outgoing calls. The call monitoring server continuously or periodically captures the call state or device state data, as well as other attribute data. This captured data may be stored for later transmission to the authentication server 401 in step 414.

In optional step 408, the authentication server 401 initiates a type 2 authentication function, in which the authentication server 401 transmits a message notification prompting a user interaction via a GUI display of the mobile device 403. In a type 2 authentication function, there is no affirmative response available for the user to select; only an option to report fraud to the authentication server 401 or other device of the call center system. As such, the authentication server 401 is not awaiting a response from the mobile device 403 before proceeding with the authentication processes.

In optional step 410, the authentication server 401 initiates a type 3 authentication function, in which the authentication server 401 determines whether there is recently received authentication information that is stored in a memory or cache of the authentication server 401 or other device of the call center system. Authentication information may be stored in a database or other memory and each data entry comprise or be assigned a timestamp. If recent authentication information was received within a time threshold, then the authentication server 401 may use such data for authentication purposes in later steps of the method 400.

In step 418, the authentication server 401 uses the various types of authentication information received as responses or otherwise available to the authentication server 401 to execute a programmatic fraud analysis process. The fraud analysis process references the current authentication information to execute one or more algorithms that generate a predictive authentication score for the call. In some implementations, fraud analysis process further retrieves and uses historical data, which may include type 3 data or other data received from the mobile device 403. Is should be appreciated that, in various embodiments, the risk score may also be computed using historical data and/or previously determined reputation information received from a reputational database, which stores data records containing reputation data indicating the riskiness of the caller according to the identifying information of the caller. Additionally or alternatively, a risk analysis engine may generate a risk score the call based upon the historical data, metadata, and/or reputation data generated, received, or extracted from the various data sources. The authentication server 401 may generate an authentication score based upon the data obtained from prior step 404 (e.g., device states, device metadata); and may further generate a risk score using the data obtained from the mobile application of the mobile device 403 and the historical data. In step 420, the authentication server 401 uses the risk score and the authentication score to generate a final score.

In optional step 422, the authentication server may execute an enrollment procedure after executing the authentication processes. When a caller has been authenticated, the authentication server or enterprise server may enroll the user passively, so that for future calls the user can be authenticated passively without user interaction. After the user has been authenticated, the authentication server references the call states of the call or the mobile device 403 previously or make another request to the mobile device 403 to retrieve the call state. The authentication server 401 may compare the received call state against the expected call state, as determined by the authentication server 401 or received from the enterprise server or other device of the call center system. In some implementations, the authentication server 401 may check for state transition with the enterprise server. For example, the enterprise server may put the user on hold (e.g., "hold" call state) and instruct the authentication server to query the state of the mobile device 403 to determine whether the mobile device 403 was on hold (e.g., "hold" device state). The enterprise server may later remove the user from hold (e.g., "active" call state) and instruct the authentication server 401 to query whether the state of the device changed accordingly. If there is a strong correlation, then the user and the device may be enrolled. Non-limiting examples of call authentication using call states can be found in U.S. patent application Ser. No. 16/287,879, entitled "Silent Caller ID Verification Using Callback Request," filed Feb. 27, 2019, which claims priority to U.S. Provisional Application No. 62/640,826, filed Mar. 9, 2018, each of which is incorporated by reference in its entirety.

In step 424, the authentication score or a result derived from the authentication score is transmitted to the enterprise server or other device of the system. The enterprise server or the authentication server may then approve or deny authentication for the current inbound call based on whether the final score and/or the information obtained from the authentication server 401 satisfies a threshold score value, amount of information, or another threshold metric.

With reference to step 404, in some embodiments, the authentication server or enterprise server is configured to disallow authentication where no device ID is found in the database. If the authentication server cannot retrieve the device ID against the queried account ID sent by the enterprise server, then the authentication server 401 concludes the caller device is not enrolled and registered. The authentication server can generate and respond to the enterprise server with a risk score that will fail an authentication threshold.

Figure 5B:
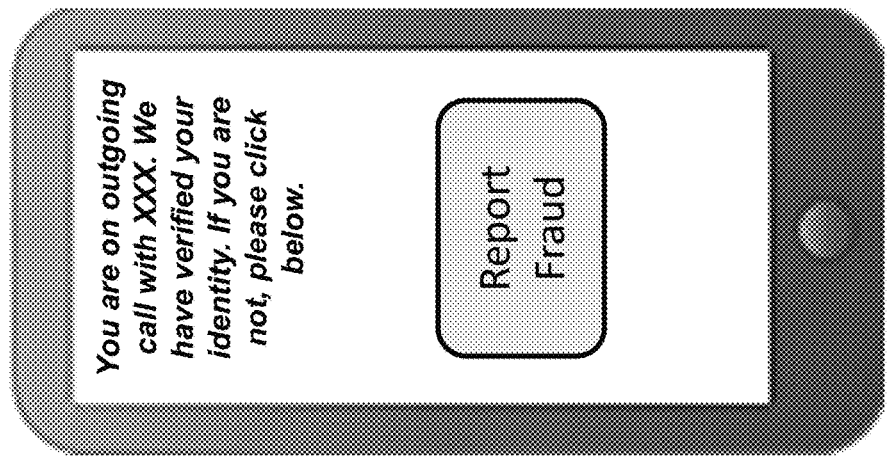
FIGS. 5A-5B show notifications displayed at a graphical user interface of a mobile device, according to an embodiment.
Figure 5A:
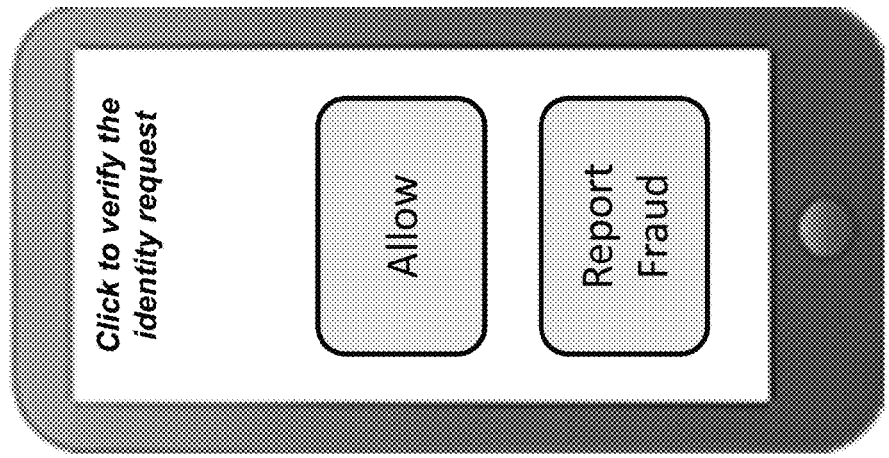

FIG. 5A shows an illustrative message notification 500*a* displayed at a GUI of a mobile device. The message notification 500*a* includes a GUI having two user interface elements. A first GUI button to indicate an affirmative authentication response from user, thereby indicating the authentication request should proceed, and a second GUI button to, for example, report fraud or otherwise indicate a negative authentication response. Each of these buttons transmits a response to authentication server, which the authentication server uses when determining whether to authenticate a call made to a call center system.

FIG. 5B shows an illustrative message notification 500*b* displayed at a GUI of a mobile device. The message notification 500*a* includes a GUI having one user interface element: a GUI button to allow the user to indicate report fraud or otherwise indicate a negative authentication response. If the user actuates the report fraud button, the mobile devices transmits a response to authentication server, which the authentication server uses when determining whether to authenticate a call made to a call center system. The report fraud button may automatically or by weighted value for scoring deny authentication of the call and trigger the authentication server or enterprise server to execute various remedial process. If the user does not enter a response, because the user does not object to the content of the message notification 500*b*, then the server may automatically determine an approval was received from the user after a threshold amount of time.

Enrollment

Figure 6B:
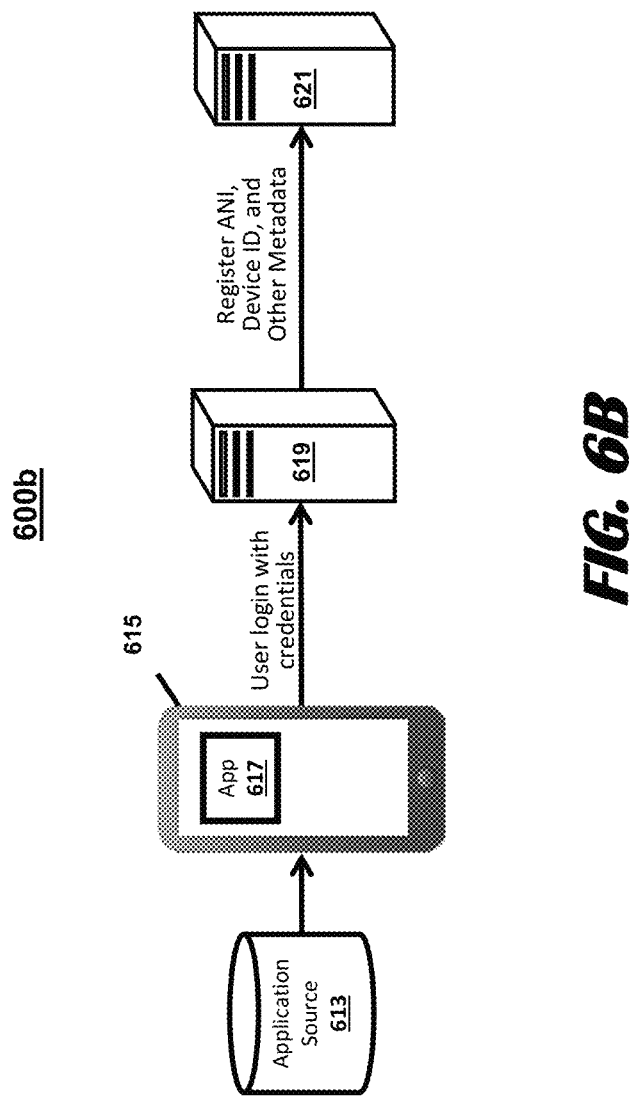
FIGS. 6A-6B show an enrollment process, according to an embodiment.
Figure 6A:
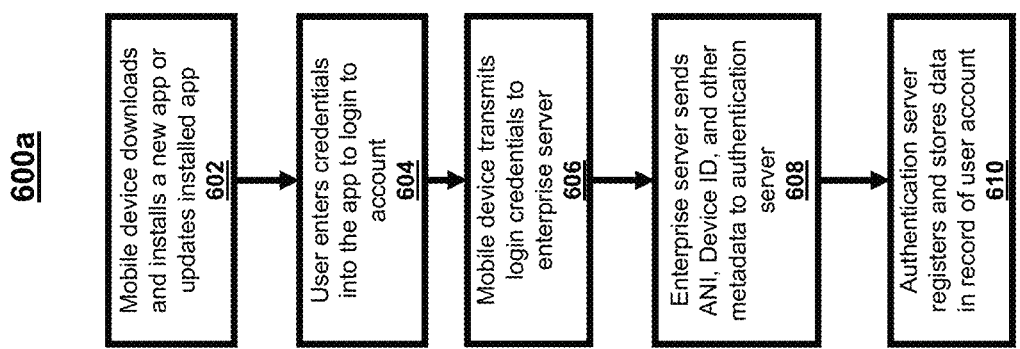

FIGS. 6A-6B relate to an illustrative embodiment for enrollment. FIG. 6A shows execution steps of an enrollment method 600*a* and FIG. 6B shows information flow among components of a system 600*b* according to the illustrative embodiment. It should be appreciated that embodiments may include additional or alternative steps, or may omit steps, from those shown in FIG. 6A, but still fall within the scope of this disclosure. It may likewise be appreciated that components of the system 600*b* may be incorporated or distributed into more or fewer devices from those components shown in FIG. 6B.

In step 602, a mobile device 615 downloads and installs an application 617 associated with a call center. The downloaded application 617 may be a new installation of the application 617, a re-installation of the application 617, or an update to a previously installed instance of the application 617. The mobile device 615 may download the application 617 from an application source 613. In some implementations, the application source 613 may be a datastore hosted at an application server or other enterprise server 619 of an enterprise infrastructure; and in some implementations, the application source 613 may be a datastore hosted on a server of a third-party application service (e.g., Apple App Store®, Google Play®).

In step 604, the user operating the mobile device 615 enters login credentials into the application 617 to access a user account or other service requiring authentication. Non-limiting examples of the credentials may include a password, PIN, biometric data, and private/public keys, among others.

In step 606, the mobile device 615 transmits the login credentials to an enterprise server 619. In step 608, the enterprise server 619 sends one or more ANIs of the mobile device 615, a device ID of the mobile device 615, and other types of metadata to an authentication server 621. In some implementations, these credentials are transferred from the enterprise server 619 to the authentication server 621 along with a device ID (e.g., MAC address, UUID, IDFA, Google AAID), an account ID, and any registered ANIs that may be on file for the account in a database.

An account ID may be any type of data that can be used by a server of the system to query a database, for example, in order to retrieve an authentication score of a call involving the user. Non-limiting examples of the account ID may be a phone number, account number, email address, or some form of a hashed key.

In step 610, the authentication server 621 registers and stores the authenticating data into a data record for the user account. The data record is stored within a user database, which may be hosted on the authenticating server 621 or other computing device of the enterprise infrastructure.

FIGS. 7A-7B relate to an illustrative embodiment for enrollment. FIG. 7A shows execution steps of a method 700*a* enrollment and FIG. 7B shows information flow among components of a system 700*b* according to the illustrative embodiment. It should be appreciated that embodiments may include additional or alternative steps, or may omit steps, from those shown in FIG. 7A, but still fall within the scope of this disclosure. It may likewise be appreciated that components of the system 700*b* may be incorporated or distributed into more or fewer devices from those components shown in FIG. 7B.

In step 702, a mobile device 715 downloads and installs an application 717 associated with a call center. In step 704 the user operating the mobile device 715 enters login credentials into the application 717 to access a user account or other service requiring authentication. In step 706, the mobile device 715 transmits the login credentials to an enterprise server 719. In step 708, the enterprise server 719 sends ANI and device ID to an authentication server 721. In step 710, the mobile device 715 sends other metadata to the authentication server 712. In step 712, the authentication server 721 registers and stores data in record of user account.

FIGS. 8A-8B related to an illustrative embodiment for enrollment. FIG. 8A shows execution steps of a method 800*a* enrollment and FIG. 8B shows information flow among components of a system 800*b* according to the illustrative embodiment. It should be appreciated that embodiments may include additional or alternative steps, or may omit steps, from those shown in FIG. 8A, but still fall within the scope of this disclosure. It may likewise be appreciated that components of the system 800*b* may be incorporated or distributed into more or fewer devices from those components shown in FIG. 8B.

In step 802, a mobile device 815 downloads and installs an application 817 associated with a call center. In step 804 the user operating the mobile device 815 enters login credentials into the application 817 to access a user account or other service requiring authentication. In step 806, the mobile device 815 transmits the login credentials to an enterprise server 819. In step 808, the enterprise server 819 sends an ANI and device ID back to the mobile device 815. In step 810, the mobile device 815 sends the ANI, the device ID, and other metadata to an authentication server 821. In step 812, the authentication server 821 registers and stores the user authenticating data in a user record for the user account.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computer via a first communication channel, an indication of an inbound call from an inbound device, the inbound call purportedly originating from a registered caller;
   transmitting, by the computer during the inbound call via a second communication channel using a registered phone number associated with a registered device associated with the registered caller, one or more requests to the registered device associated with the registered caller, a first request of the one or more requests comprising a message notification configured to display a confirmation element at a graphical user interface of the registered device, the first request comprising at least one of: a short message service (SMS) message, a multimedia message service (MMS) message, or a rich communication service (RCS) message;
   receiving, by the computer via the second communication channel, one or more responses to the one or more requests from the registered device, the one or more responses including a first response to the first request received according to an input to the confirmation element and one or more attributes of the registered device received with the input to the confirmation element; and
   executing, by the computer, an authentication routine to authenticate the inbound call using the one or more responses for the one or more requests, the authentication routine includes applying, by the computer, a machine-learning architecture on one or more attributes of the inbound device of the inbound call purporting to be associated with the registered caller and the one or more attributes of the registered attributes received in the one or more responses and generating, by the computer, an authentication score indicating a degree of similarity between the one or more attributes of the inbound device and the one or more attributes of the registered device received in the one or more responses with the input to the confirmation element; and
   authenticating, by the computer, the inbound call based upon whether the authentication score satisfies a threshold.

2. The method according to claim 1, wherein the computer receives from the registered device a second response to a second request for a first state of the registered device, and wherein the method further comprises:
   identifying, by the computer, a second state of the inbound call; and
   comparing, by the computer, the second state of the inbound call against the first state of the registered device.

3. The method according to claim 2, wherein the method further comprises:
comparing, by the computer, the one or more attributes of the registered device received with the confirmation element against the one or more attributes of the inbound device.

4. The method according to claim 1, wherein the computer transmits the first request via the second communication channel, and wherein the first request comprises a push notification to a mobile application of the registered device.

5. The method according to claim 1, wherein the computer receives a caller identifier (caller ID) for the registered caller with the indication of the inbound call, and wherein the method further comprises:
identifying, by the computer, in a database a device identifier (device ID) for the registered device associated with the caller ID, wherein the computer transmits the one or more requests to the registered device using the device ID.

6. The method according to claim 1, further comprising:
in response to receiving the inbound call, authenticating, by the computer, the inbound call according to an initial authentication routine using a set of user credentials received via the first communication channel.

7. The method according to claim 1, further comprising generating, by the computer, a risk score based upon the one or more responses including device identification data from the registered device and corresponding device identification data from a device that originated the inbound call, wherein the computer authenticates the inbound call in response to determining that the risk score satisfies a threshold score.

8. The method according to claim 1, further comprising determining, by the computer, whether a device that originated the inbound call has a mobile application associated with a call center system installed.

9. The method according to claim 1, wherein the first request comprises the confirmation element configured to transmit a negative authentication response from the registered device, and wherein the method further comprises:
determining, by the computer, that the first response to the first request received according to the input to the confirmation element is an affirmative response after a predetermined threshold period of time from transmitting the first request.

10. A system comprising:
a database configured to store a plurality of data records associated with a plurality of registered callers; and
a computer comprising a processor configured to:
receive, via a first communication channel, an indication of an inbound call from an inbound device, the inbound call purportedly originating from a registered caller;
transmit, during the inbound call via a second communication channel using a registered phone number associated with a registered device associated with the registered caller, one or more requests to the registered device associated with the registered caller, a first request of the one or more requests comprising a message notification configured to display a confirmation element at a graphical user interface of the registered device, the first request comprising at least one of: a short message service (SMS) message, a multimedia message service (MMS) message, or a rich communication service (RCS) message;
receive, via the second communication channel, one or more responses to the one or more requests from the registered device, the one or more responses including a first response to the first request received according to an input to the confirmation element and one or more attributes of the registered device received with the input to the confirmation element; and
execute an authentication routine to authenticate the inbound call using the one or more responses for the one or more requests, the authentication routine includes applying a machine-learning architecture on one or more attributes of the inbound device of the inbound call purporting to be associated with the registered device caller and the one or more attributes of the registered attributes received in the one or more responses and generating an authentication score indicating a degree of similarity between the one or more attributes of the inbound device and the one or more attributes of the registered device received in the one or more responses with the input to the confirmation element; and
authenticating, by the computer, the inbound call based upon whether the authentication score satisfies a threshold.

11. The system according to claim 10, wherein the computer receives from the registered device a second response to a second request for a first state of the registered device, and wherein the computer is further configured to:
identify a second state of the inbound call; and
compare the second state of the inbound call against the first state of the registered device.

12. The system according to claim 11, wherein the computer is configured to:
compare the one or more attributes of the registered device received with the input to the confirmation element against the one or more attributes of the inbound device.

13. The system according to claim 10, wherein the computer transmits the first request via the second communication channel, and wherein the first request comprises a push notification to a mobile application of the registered device.

14. The system according to claim 10, wherein the computer is configured to:
receive a caller identifier (caller ID) for the registered caller with the indication of the inbound call; and
identify in the database a device identifier (device ID) for the registered device associated with the caller ID, wherein the computer transmits the one or more requests to the registered device using the device ID.

15. The system according to claim 10, wherein in response to receiving the inbound call the computer is further configured to authenticate the inbound call according to an initial authentication routine using a set of user credentials received via the first communication channel.

16. The system according to claim 10, further comprising generating, by the computer, a risk score based upon the one or more responses including device identification data from the registered device and corresponding device identification data from a device that originated the inbound call, wherein the computer authenticates the inbound call in response to determining that the risk score satisfies a threshold score.

17. The system according to claim 10, wherein the computer is further configured to determine whether a device that originated the inbound call includes a mobile application associated with a call center system.

18. The system according to claim 10, wherein the first request comprises the confirmation element configured to transmit a negative authentication response from the registered device, and wherein the computer is configured to determine that the first response is an affirmative response after a predetermined threshold period of time from transmitting the first request.

\* \* \* \* \*